United States Patent [19]

Donatelli et al.

[11] 4,421,656

[45] Dec. 20, 1983

[54] SILICONE EMULSIFIER COMPOSITION, INVERT EMULSIONS THEREFROM AND METHOD THEREFOR

[75] Inventors: Philip A. Donatelli; Joseph W. Keil, both of Midland, Mich.

[73] Assignee: Dow Corning Corporation, Midland, Mich.

[21] Appl. No.: 336,153

[22] Filed: Dec. 31, 1981

[51] Int. Cl.$^3$ .......................... C09K 7/06; E21B 43/00
[52] U.S. Cl. .............................. 252/8.5 P; 252/8.55 R; 252/309; 252/351; 524/265; 524/267
[58] Field of Search ........... 252/8.5 P, 8.5 M, 8.55 R, 252/309, 351; 524/265, 267

[56] References Cited

U.S. PATENT DOCUMENTS

| | | | |
|---|---|---|---|
| 2,676,182 | 4/1954 | Daudt et al. | 252/313 X |
| 2,846,458 | 8/1958 | Haluska | 252/358 X |
| 3,709,819 | 1/1973 | Browning et al. | 252/8.5 P |
| 4,122,029 | 10/1978 | Gee et al. | 252/309 |
| 4,381,241 | 4/1983 | Romenesko et al. | 252/8.5 P |

*Primary Examiner*—Herbert B. Guynn
*Attorney, Agent, or Firm*—George A. Grindahl

[57] ABSTRACT

An improved silicone emulsifier composition is disclosed which is particularly useful for preparing thermally stable, solids-free invert emulsions for the deep well-drilling art. The emulsifier composition comprises a surface active polydiorganosiloxane bearing one or more polyoxyalkylene radicals and one or more hydrocarbon radicals having from 6 to 18 carbon atoms and a resin component comprising $(CH_3)_3SiO_{\frac{1}{2}}$ siloxane units and $SiO_{4/2}$ siloxane units. Improved invert emulsions and a method for their preparation are also disclosed. The invert emulsions comprise the improved silicone emulsifier of this invention as well as a brine discontinuous phase and a liquid hydrocarbon continuous phase.

23 Claims, No Drawings

SILICONE EMULSIFIER COMPOSITION, INVERT EMULSIONS THEREFROM AND METHOD THEREFOR

BACKGROUND OF THE INVENTION

The present invention relates to invert emulsions for the well-drilling industry, to a method for their preparation and to an emulsifier composition useful therein. More particularly, the present invention relates to improved emulsions of a brine in a liquid hydrocarbon, and further comprising an improved silicone emulsifier composition, which are useful in well-drilling operations, such as in gas- and/or oil-well drilling, as a drilling fluid, a completion fluid, a workover fluid, a casing pack fluid, a fracturing fluid, a packer fluid and a spacer fluid.

Invert emulsions, in the form of drilling muds, completion fluids and packer fluids are well known in the well-drilling art. Invert emulsions typically consist of a fluid phase comprising from 15 to 45 percent by volume of a $CaCl_2$ brine and 55 to 85 percent by volume of diesel oil, and a solid phase comprising agents for pressure control, filtration control, viscosity control, gelling, etc. An invert emulsion drilling mud generally contains from 5 to 30 percent by volume of the brine.

While conventional invert emulsions are used in drilling deep wells, where high temperature and pressure are commonly encountered, they are not completely satisfactory for such a use. For example, invert emulsions are sometimes not sufficiently stable at the high temperatures encountered in deep wells. Furthermore, the use of large amounts of a weighting agent in an invert emulsion to achieve pressure control in deep wells is often undesirable because the permeability of the producing zone can be adversely affected. Heavier brines, such as brines containing $CaBr_2$ and/or $ZnBr_2$, have been used to increase the density of silicone-free invert emulsions, thereby achieving greater pressure control; however, the stability of these heavier emulsions is marginal or non-existent at high temperature.

Thermally stable invert emulsions comprising a brine, a liquid hydrocarbon and a polydiorganosiloxane have been disclosed by Romenesko et al., U.S. Pat. No. 236,968, filed on Feb. 23, 1981 and assigned to the assignee of this invention. While the invert emulsions of Romenesko et al. constitute a significant advance in the art, some of them do not possess a high degree of thermal stability unless they are thickened with conventional thickening agents. In particular, the solids-free invert emulsions of Romenesko et al. comprising a heavy brine of $CaBr_2$ and $ZnBr_2$ seem to degrade at high temperature, apparently because HBr, which is produced by the heavy brine at high temperature, degrades the polydiorganosiloxane emulsifier. Invert emulsions, and particularly solids-free emulsions, comprising a heavy brine and having greater stability in downhole conditions are therefore still needed.

BRIEF SUMMARY OF THE INVENTION

It is an object of this invention to provide an improved invert emulsion which is suitable for use in the well-drilling industry. It is another object of this invention to provide solids-free invert emulsions of a high density brine which have stability at high temperatures and pressures. It is another object of this invention to provide stable, solids-free invert emulsions having high density and being suitable for use in a deep-well drilling. It is also an object of this invention to provide a method for preparing the invert emulsions of this invention. It is yet another object of this invention to provide a silicone emulsifier composition which is useful for preparing improved invert emulsions.

These objects, and others which will become obvious after considering the following disclosure and appended claims, are obtained by the present invention which comprises emulsifying a brine in a liquid hydrocarbon containing an emulsifier composition comprising certain polydiorganosiloxane surface active agents and certain organopolysiloxane resins. According to this invention it is possible not only to prepare a solids-free, thermally stable emulsion of a high density brine but also to prepare a stable emulsion comprising a fluid phase having a major amount of a high density brine and a minor amount of a liquid hydrocarbon. The resulting invert emulsions are sufficiently dense to permit their use as a solids-free completion fluid in deep-well drilling; some of them can also be formulated to contain solid and/or liquid components which are commonly used in the well-drilling art for various purposes, such as for preparing invert emulsion drilling muds.

While not intending to be limited by theory we believe that the present invention provides improved brine-in-liquid hydrocarbon emulsions because the organopolysiloxane resin copolymer component acts to protect the polydiorganosiloxane surface active component from the degrading action of acidic materials, such as HBr, which are produced by the brine at high temperature, and thereby provides improved emulsion stability.

DETAILED DESCRIPTION OF THE INVENTION

In one aspect the present invention relates to an emulsifier composition, optionally containing an organic solvent, said emulsifier composition consisting essentially of (a) from 30 to 90 percent by weight of a polydiorganosiloxane having the formula $Z_3SiO\{(CH_3)_2SiO\}_x\{(CH_3)(R)SiO\}_y\{(CH_3)(Q)SiO\}_zSiZ_3$ wherein Q denotes a polyoxyalkylene radical having the formula $-R'O(CH_2CH_2O)_p(CH_2CHCH_3O)_qR''$, R denotes a monovalent hydrocarbon radical having from 6 to 18 carbon atoms, inclusive, R' denotes a divalent organic radical bonded to a silicon atom by a silicon-carbon bond, R'' denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or a Q radical, or an R radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the $-(CH_2CH_2O)_p(CH_2CHCH_3O)_q-$ portion of the Q radical, there being an average of at least one Q radical and an average of at least one R radical per molecule of the polydiorganosiloxane, and (b) from 10 to 70 percent by weight of a solid benzene-soluble organopolysiloxane resin copolymer consisting essentially of $(CH_3)_3SiO_{\frac{1}{2}}$ siloxane units and $SiO_{4/2}$ siloxane units, there being from 0.6 to 0.9, inclusive, of said $(CH_3)_3SiO_{\frac{1}{2}}$ siloxane units for every $SiO_{4/2}$ siloxane unit.

In another aspect the present invention relates to an emulsion composition comprising (A) from 40 to 75 parts by volume of a brine as a discontinuous phase, (B) from 25 to 60 parts by volume of a liquid hydrocarbon selected from the group consisting of paraffins having a flash point of at least 100° F., kerosene, diesel oil, crude oil, turbine fuel, mineral oil and gas oil as a continuous phase, (A) and (B) totaling 100 parts by volume and 100 parts by weight, and (C) from 1.0 to 10 parts by weight, for every 100 parts by weight of brine plus liquid hydrocarbon, of an emulsifier composition consisting essentially of from 30 to 90 percent by weight of (a) a polydiorganosiloxane having the formula

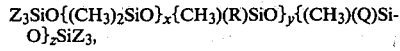

wherein Q denotes a polyoxyalkylene radical having the formula —R'O(CH$_2$CH$_2$O)$_p$(CH$_2$CHCH$_3$O)$_q$R", R denotes a monovalent hydrocarbon radical having from 6 to 18 carbon atoms, inclusive, R' denotes a divalent organic radical bonded to a silicon atom by a silicon-carbon bond, R" denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or an R radical or a Q radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —(CH$_2$CH$_2$O)$_p$(CH$_2$CHCH$_3$O)$_q$—portion of the Q radical, there being an average of at least one Q radical and an average of at least one R radical per molecule of the polydiorganosiloxane, and (b) from 10 to 70 percent by weight of a solid, benzene-soluble organopolysiloxane resin copolymer consisting essentially of (CH$_3$)$_3$SiO$_{\frac{1}{2}}$ siloxane units and SiO$_{4/2}$ siloxane units, there being from 0.6 to 0.9, inclusive, of said (CH$_3$)$_3$SiO$_{\frac{1}{2}}$ siloxane units for every SiO$_{4/2}$ siloxane unit.

The present invention further relates to a method for preparing the emulsion compositions of this invention comprising (I) mixing to form a solution, (i) 1.0 to 10 parts by weight of an emulsifier composition consisting essentially of (a) from 30 to 90 percent by weight of a polydiorganosiloxane having the formula

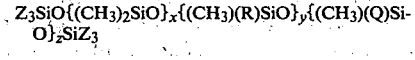

wherein Q denotes a polyoxyalkylene radical having the formula —R'O(CH$_2$CH$_2$O)$_p$(CH$_2$CHCH$_3$O)$_q$R", R denotes a monovalent hydrocarbon radical having an average of from 6 to 18 carbon atoms, inclusive, R' denotes a divalent organic radical bonded to a silicon atom by a silicon-carbon bond, R" denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or an R radical or a Q radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —(CH$_2$CH$_2$O)$_p$(CH$_2$CHC-H$_3$O)$_q$—portion of the Q radical, there being an average of at least one Q radical and an average of at least one R radical per molecule of the polydiorganosiloxane, and (b) from 10 to 70 percent by weight of a solid, benzene-soluble organopolysiloxane resin copolymer consisting essentially of (CH$_3$)$_3$SiO$_{\frac{1}{2}}$ siloxane units and SiO$_{4/2}$ siloxane units, there being from 0.6 to 0.9, inclusive, of said (CH$_3$)$_3$SiO$_{\frac{1}{2}}$ siloxane unit for every SiO$_{4/2}$ siloxane unit, and (ii) aV parts by volume of a liquid hydrocarbon selected from the group consisting of paraffins having a flash point of at least 100° F., kerosene, diesel oil, crude oil, turbine fuel, mineral oil and gas oil, (II) mixing the solution of step (I) with bV parts by volume of a liquid hydrocarbon selected from the group stated in (ii), (III) mixing V' part by volume of a brine with the solution of step (II) with sufficient shear energy to provide an emulsion having a brine particle size of less than 10 micrometers in diameter, and (IV) mixing the emulsion of step (III) with cV parts by volume of a liquid hydrocarbon selected from the group stated in (ii), wherein V has a value of from 25 to 60 parts by volume, a has a value of from greater than zero to 1, b has a value of from zero to less than 1, c has a value of from zero to less than 1, a plus b plus c has a value of 1, V' has a value of from 40 to 75 parts by volume and V plus V' totals 100 parts by weight and 100 parts by volume.

The discontinuous phase of the emulsion compositions of this invention is a brine. Herein, the term brine is used in its broadest sense, i.e. an aqueous solution of a salt containing at least 3 percent by weight of the salt. Preferably the brine is an aqueous solution of the salt, saturated at 20° C. The term brine further includes brine occuring naturally or brine prepared synthetically. It is within the scope and spirit of this invention to dissolve one or more salts in natural brine to prepare a brine suitable for use in the emulsions of this invention.

The salt portion of the brine preferably has a high solubility in water at room temperature so that the emulsion compositions of this invention can be formulated to have a wide range of densities. The salt advantageously has, in addition to a high solubility in water, a large formula weight so that the brine can be formulated to have a high density, for example up to 22 pounds per gallon (2642 kilograms per cubic meter).

Salts being suitable for use in the emulsions of this invention, include sodium chloride, sodium carbonate, potassium chloride, potassium carbonate, calcium chloride, calcium bromide, zinc chloride, zinc bromide and mixtures thereof.

Conveniently, a suitable brine for the emulsions of this invention can comprise the natural brine, optionally mixed with a salt, that is frequently present at the drilling site where these emulsions are used. The present invention contemplates the storing of the other components of these emulsions, hereinafter delineated, at the drilling site as separate and/or mixed components and formulating the emulsions of this invention in-the-field, as desired.

A preferred brine in the emulsion compositions of this invention comprises water saturated with a mixture of calcium bromide and zinc bromide and having a density of about 20 pounds per gallon at 20° C. Such a heavy brine can be emulsified in a liquid hydrocarbon according to this invention to provide an emulsion that needs no additional weighting agent, such as barium sulfate, to permit its use as a completion fluid in petroleum- and/or gas-well drillings. Advantageously, the heavy brine emulsions of this invention have been found to be stable to breaking at 400° F. under pressure, for long periods of time and are therefore considered to be valuable compositions for use as a drilling fluid in deep well conditions.

The continuous phase of the emulsion compositions of this invention is a liquid hydrocarbon selected from the group consisting of paraffins having a flash point of at least 100° F., kerosene, turbine fuel, crude oil, diesel oil, gas oil, mineral oil and mixtures thereof.

Conveniently and economically, the liquid hydrocarbon can be the crude oil that is being recovered from, and/or the hydrocarbon fuel, such as diesel fuel, that is being used at, the drilling site where the compositions of this invention are used. When additional factors beyond convenience and economics, such as safety, handling and environmental factors, are considered, mineral oil can be advantageously used as the liquid hydrocarbon in the emulsions of this invention because of its relatively low volatility and relatively low odor. In any case the emulsifier composition, delineated below, can be conveniently stored at the drilling site as a solventless component, or as an organic solvent solution such as a solution in said liquid hydrocarbon, if desired, and the emulsions of this invention prepared therefrom in-the-field as desired.

The emulsifier composition of this invention consists essentially of a mixture of from 30 to 90, preferably 60 to 80, percent by weight of a polydiorganosiloxane component displaying surface active properties and from 10 to 70, preferably 20 to 40, percent by weight of a solid, benzene-soluble organopolysiloxane resin copolymer (herein also resin copolymer or resin) of trimethylsiloxy units and silica units, each component being characterized as follows.

The polydiorganosiloxane component of the emulsifier and emulsion compositions of this invention has the formula (1).

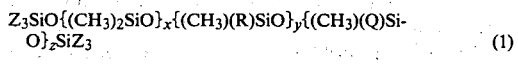
$Z_3SiO\{(CH_3)_2SiO\}_x\{(CH_3)(R)SiO\}_y\{(CH_3)(Q)SiO\}_zSiZ_3$ (1)

In formula (1) each R denotes, independently, a silicon-bonded monovalent hydrocarbon radical having from 6 to 18 carbon atoms, both inclusive, such as straight-chained or branched-chain alkyl radicals, such as hexyl, heptyl, octyl, nonyl, decyl, undecyl, dodecyl, tetradecyl, hexadecyl and octadecyl; cycloaliphatic radicals, such as cyclohexyl; aryl radicals, such as phenyl, tolyl, xenyl and naphthyl; and arylalkyl radicals, such as benzyl, 2-phenylethyl and 2-phenylpropyl. Preferably, R notes an alkyl radical having from 6 to 18 carbon atoms, such as the octyl, decyl or dodecyl radical, to provide easy solubility of the polydiorganosiloxane in the liquid hydrocarbon of the emulsion compositions of this invention. Formula (1) can contain all the same R radicals or mixtures of two or more R radicals, as desired.

In formula (1) each Q denotes, independently, a silicon-bonded polyoxyalkylene radical having the formula (2).

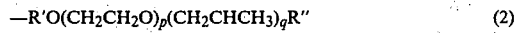
$-R'O(CH_2CH_2O)_p(CH_2CHCH_3)_qR''$ (2)

In the formula (2), R' denotes a divalent organic radical which bonds the polyoxyalkylene radical to a silicon atom by way of a silicon-carbon bond to provide hydrolytic stability therefor. The composition of the R' radical is not critical as long as it does not undergo significant hydrolytic cleavage in the emulsion composition of this invention. Typically, R' is an alkylene radical, such as —CH₂CH₂—, —CH₂CH₂CH₂— or —CH₂CH₂CH(CH₃)—.

In formula (2) R" denotes a monovalent radical selected from the group consisting of the hydrogen atom; an alkyl radical, such as methyl, ethyl, propyl and butyl; an aryl radical, such as phenyl or tolyl; an arylalkyl radical, such as benzyl; or an acyl radical, such as acetyl. The composition of the R" radical is not critical; however, it is preferably a relatively small radical such as the methyl radical, the acetyl radical or, most preferably, the hydrogen atom.

In formula (2), p and q denote numbers whose sum is sufficient to provide an average formula weight of from 600 to 3500 for the —(CH₂CH₂O)$_p$(CH₂CHCH₃O)$_q$— portion of the Q radical and the value of p is equal to or greater than the value of q. That is to say, the ratio of the number of oxypropylene units to the number of oxyethylene units in the Q radical has a value equal to or less than 1, such as 0, 0.1, 0.2, 0.5 and 1.0. In a preferred embodiment of this invention the sum of p+q has a value of about 40.

In formula (1) Z denotes a monovalent hydrocarbon radical having from 1 to 5 carbon atoms, inclusive, or a Q radical, or an R radical, as hereinabove delineated. The composition of the Z radical is not critical except when the values of y and/or z in the formula (1) are/is zero, in which case a sufficient number of Z radicals must be said R radical and/or said Q radical, so that the polydiorganosiloxane contains, per molecule, an average of at least one R radical and an average of at least one Q radical. Typical radicals contemplated as Z radicals, in addition to said R and Q radicals delineated above, include methyl, ethyl, propyl, isopropyl and vinyl. Preferably all Z radicals are methyl radical.

In formula (1) x denotes a number having an average value of from 0 to 400, preferably from 0 to 100; y denotes a number having an average value of from 0 to 400, preferably from 1 to 100; and z denotes a number having an average value of from 0 to 5, preferably from 1 to 5; within the further requirement that the sum of x+y+z has a value of from 30 to 400, preferably from 30 to 200.

The polydiorganosiloxane component can also contain small amounts of unreacted precursor silicon-bonded radicals, such as hydrogen radicals, or chloroalkyl radicals which were present in the precursor materials that was used to prepare the polydiorganosiloxane, and trace amounts of incidental silicon-bonded radicals, such as hydroxyl radicals or alkoxy radicals which were incidentally introduced into the molecule during preparation of the polydiorganosiloxane component. Preferably there are no precursor radicals and no incidental radicals in the polydiorganosiloxane.

A first preferred polydiorganosiloxane component in the emulsifier and emulsion compositions of this invention has the formula (1a), wherein z has an average value of from 1 to 5 and the sum of y+z has an average value of from 30 to 70.

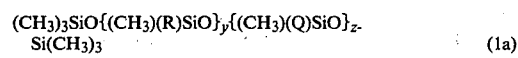
$(CH_3)_3SiO\{(CH_3)(R)SiO\}_y\{(CH_3)(Q)SiO\}_zSi(CH_3)_3$ (1a)

A highly preferred polydiorganosiloxane having the formula (1a) is obtained when R denotes an alkyl radical and Q denotes a polyoxyalkylene radical having the formula (2a) wherein the sum of p+q has a value of about 40; i.e. p has an average value of from about 20 to 40 and q has an average value of from about 0 to 20.

$$-CH_2CH_2CH_2O(CH_2CH_2O)_p(CH_2CHCH_3O)_qH \qquad (2a)$$

A second preferred polydiorganosiloxane component in the emulsifier and emulsion compositions of this invention has the formula (1b), wherein x has an average value of about 100, y has an average value of from about 30 to 70 and z has an average value of from 1 to 5.

$$(CH_3)_3SiO\{(CH_3)_2SiO\}_x\{(CH_3)(R)SiO\}_y\{(CH_3)(Q)SiO\}_zSi(CH_3)_3 \qquad (1b)$$

A highly preferred polydiorganosiloxane having the formula (1b) is obtained when R and Q are as noted above for the first highly preferred polydiorganosiloxane component.

The polydiorganosiloxane component may be prepared by any suitable method; several are disclosed in the organosilicon art. A preferred method for preparing the polydiorganosiloxane component comprises reacting a methyl siloxane having terminal and/or in-the-chain silicon-bonded hydrogen radicals with an olefin having from 6 to 18 carbon atoms, such as 1-octene or 1-dodecene, and an olefinically terminated polyoxyalkylene, such as $CH_2=CHCH_2O(CH_2CH_2O)_p-(CH_2CHCH_3O)_qH$ in the presence of a platinum-containing catalyst, such as $H_2PtCl_6.6H_2O$. In this preferred method the olefin and the olefinically terminated polyoxyalkylene are most preferably reacted sequentially, olefin first, with the methylsiloxane containing silicon-bonded hydrogen radicals. The disclosures of U.S. Pat. Nos. 3,657,305; 3,234,252; 4,047,958; 3,427,271 and 2,846,458 are hereby incorporated herein by reference to further show methods for preparing the polydiorganosiloxane component of the compositions of this invention. It is to be understood that polydiorganosiloxanes that have been prepared in this preferred manner can contain small amounts of unreacted olefin and/or olefin-terminated polyoxyalkylene.

Many polydiorganosiloxanes suitable for use in the emulsifier and emulsion compositions of this invention are viscous liquids or waxy solids and are conveniently prepared and used in this invention as a solution in a suitable organic solvent, such as toluene, xylene, or the liquid hydrocarbon component hereinabove delineated.

The solid, benzene-soluble organopolysiloxane resin copolymer component of the emulsifier and emulsion compositions of this invention is well known in the art. It is best prepared by the method of Daudt et al., U.S. Pat. No. 2,676,182 which is hereby incorporated herein by reference.

Briefly, said method for the preparation of the resin copolymer component comprises treating an acidified aqueous-alcoholic solution of sodium silicate with a source of $(CH_3)_3SiO_{\frac{1}{2}}$ units, e.g. $(CH_3)_3SiCl$ or $(CH_3)_3SiOSi(CH_3)_3$, in sufficient amount to provide from 0.6 to 0.9 $(CH_3)_3SiO_{\frac{1}{2}}$ siloxane units for every $SiO_{4/2}$ siloxane unit in the acidified sodium silicate.

Being a solid, the resin copolymer is prepared and preferably used as an organic-solvent solution, typically a toluene or xylene solution. For the purposes of this invention it is preferable to exchange said typical organic solvent with an organic solvent having a flash point of at least 100° F., for increased safety. This solvent exchange is conveniently conducted by adding a desired amount of a higher flash point solvent to the toluene or xylene solution and thereafter removing the lower flash point solvent by distillation.

In addition to $(CH_3)_3SiO_{\frac{1}{2}}$ siloxane units and $SiO_{4/2}$ siloxane units, the resin copolymer typically contains up to 5 percent by weight of silicon-bonded hydroxyl radicals and trace amounts of silicon-bonded alkoxy radicals. The amount of silicon-bonded hydroxyl radicals can be reduced, if desired, by well-known methods, such as by further reaction with $(CH_3)_3SiCl$ or by catalyzed silanol-silanol condensation and removal of the by-produced HCl or $H_2O$, respectively.

While the resin copolymer consists essentially of $(CH_3)_3SiO_{\frac{1}{2}}$ siloxane units and $SiO_{4/2}$ siloxane units, it is within the scope and spirit of this invention to permit the presence of trace amounts of other siloxane units, such as $CH_3SiO_{3/2}$, $(CH_3)_2SiO_{2/2}$, $RSiO_{3/2}$ and $(CH_3)_2RSiO_{\frac{1}{2}}$ units, wherein R is as herein defined. Preferably said resin copolymer is free of said other siloxane units.

The emulsifier composition solutions of this invention are conveniently prepared by thoroughly mixing an organic solvent solution of the polydiorganosiloxane component and an organic solvent solution of the resin copolymer in sufficient amounts to provide from 30 to 90 percent by weight of the polydiorganosiloxane component and from 10 to 70 percent by weight of the resin copolymer, each based on the total weight of the polydiorganosiloxane plus resin copolymer. Alternatively, said sufficient amount of the polydiorganosiloxane component, free of solvent, can be mixed with the organic solvent solution of resin copolymer component in said sufficient amount to provide the emulsifier composition solutions of this invention.

The solvent-free emulsifier compositions of this invention are best prepared by removing the solvent from the emulsifier composition solutions of this invention.

A highly preferred emulsifier composition or organic solvent solution thereof of this invention consists essentially of from 60 to 80, most preferably about 75, percent by weight of the polydiorganosiloxane component and from 20 to 40, most preferably about 25, percent by weight of the resin copolymer. Such a composition has both easy handleability and good emulsifying ability. For maximum ease of handling the emulsifier compositions are used as a solution in a paraffinic hydrocarbon having a flash point of at least 100° F.

The emulsion compositions of this invention comprise from 40 to 75, preferably 50 to 70, parts by volume of the brine component and from 25 to 60, preferably 30 to 50, parts by volume of the liquid hydrocarbon component; the most preferred amounts being dependent upon the particular brine that is used, the particular liquid hydrocarbon that is used and the particular use of the emulsion composition in the well-drilling art. For example, when a solids-free completion fluid emulsion of this invention is to be used to prevent a blow-out of the well, i.e. the uncontrolled release of well-pressure, it is preferred that the emulsion composition comprise a maximum volume of a brine having a maximum density without destabilizing the emulsion to breaking (phase separation) or to inversion (phase reversal). A highly preferred emulsion composition of this invention for preventing blow-out thus comprises from 50 to 70 parts by volume of a saturated aqueous solution of $CaBr_2$ and $ZnBr_2$ and having a density of about 20 pounds per gallon at 20° C.

The amount of emulsifier component to be used in the emulsion compositions of this invention is based on the total weight of the brine plus liquid hydrocarbon and can range from 1.0 to 10, preferably 2 to 6 parts by weight for every 100 parts by weight of brine plus liquid hydrocarbon. An optimum amount of emulsifier component to be used in any particular emulsion will depend upon the particular brine and liquid hydrocarbon that is used and their relative volumes and can be determined by simple experimentation, in view of the examples hereinafter disclosed.

The emulsion compositions of this invention can be prepared by the method of this invention, using conventional emulsifying methods. Preferably the emulsifier component is dissolved in all, or a lesser portion, of the liquid hydrocarbon component to form a solution thereof and the brine component is thereafter emulsified therein with sufficient shear energy to provide an emulsion having a brine particle size of less than 10, preferably less than 1, micrometer in diameter, any remaining amount of liquid hydrocarbon thereafter being mixed with said emulsion.

Specifically, from 1.0 to 10 parts by weight of the emulsifier component is first dissolved in aV parts by volume of a liquid hydrocarbon hereinabove delineated where a denotes a number having a value of from greater than zero to 1 and V has a value of from 25 to 60 parts by volume. When a has a value of 1, V' parts by volume of the brine are emulsified in the solution of emulsifier component in liquid hydrocarbon, where V' has a value of from 40 to 75 parts by volume and the total of V+V' has a value of 100 parts by weight and 100 parts by volume, to provide the emulsion compositions of this invention.

In a preferred embodiment of this invention a has a value of less than 1, such as from 0.0001 to 0.1, to provide a solution of the emulsifier component in liquid hydrocarbon which is shipped and/or stored and is subsequently used to form the compositions of this invention. In this case the solution is subsequently diluted with bV parts by volume of a liquid hydrocarbon hereinabove delineated where b denotes a number of from zero to less than one, preferably (1-a). When b has a value of (1-a), V' parts by volume of the brine are emulsified in the diluted solution of emulsifier component in liquid hydrocarbon, where V' has a value of from 40 to 75 parts by volume and the total of V+V' has a value of 100 parts by weight and 100 parts by volume, to provide the emulsion compositions of this invention.

In a variation of the preferred embodiment of this invention b has a value of less than (1-a), preferably greater than zero. In this case V' parts by volume of the brine are emulsified in the solution of emulsifier component in liquid hydrocarbon and cV parts by volume of a liquid hydrocarbon hereinabove delineated are added to the resulting emulsion, where c has a value of (1-a-b), V' has a value of from 40 to 75 parts by volume and V+V' has a value of 100 parts by weight and 100 parts by volume, to provide the emulsion composition of this invention.

In the method of this invention the liquid hydrocarbon that is used in each step of emulsion formation may be the same or different. It is preferred that the emulsifier component be dissolved in from 0.0001 V to 0.1 V parts by volume of a paraffin hydrocarbon having a flash point of at least 100° F., and the remaining portion of liquid hydrocarbon that is used to form the emulsion be diesel fuel and/or crude oil.

It should be understood that the emulsion compositions of this invention can be prepared by mixing the emulsifier composition, or its organic-solvent solution, with the liquid hydrocarbon and thereafter emulsifying the brine therein or, alternatively, the polydiorganosiloxane component and the resin copolymer component of the emulsifier composition can be mixed with the liquid hydrocarbon without the separate preparation of the emulsifier composition or its organic-solvent solution of this invention and thereafter emulsifying the brine therein.

The method and compositions of this invention further comprises the use of an organic, non-ionic surfactant in sufficient amount to reduce the interfacial tension between the brine component and the solution of emulsifier composition without destabilizing the emulsion. Advantageously, the use of an organic, non-ionic surfactant allows the emulsion composition of this invention to be prepared under greatly reduced shear energy so that they can be prepared with simple paddle mixing instead of turbine mixing, homogenizer mixing or colloid mixing. This aspect of the invention finds great utility when the compositions of this invention are prepared in-the-field. In the method of this invention any organic, non-ionic surfactant may be incorporated at any time up to and during the emulsifying process. Preferably any organic, non-ionic surfactant is mixed with the solution of emulsifier composition before the brine component is emulsified therein. Conveniently any organic, non-ionic surfactant can be mixed with the solution of emulsifier composition in liquid hydrocarbon in the preferred method of this invention, or in the solventless emulsifier composition of this invention.

The preferred organic, non-ionic surfactant to be used in the method and compositions of this invention will depend upon the composition of the brine component. For example, a nonylphenoxypolyethoxyethanol having approximately three oxyethylene units per molecule can be an effective surfactant for reducing needed shear energy when used with light brines, such as a 30 percent by weight solution of $CaCl_2$ in water. For heavier brines, comprising $CaBr_2$ and/or $ZnBr_2$ a long-chain alkanol, such as hexanol, octanol or decanol can be an effective surfactant. Preferably the organic, non-ionic surfactant has a hydrophile-lipophile balance (H.L.B.) value of from 2 to 10.

The amount of organic, non-ionic surfactant to be used in the method of this invention is generally equal to from 0.5 to 1.5 times the amount of polydiorganosiloxane component that is used in any particular composition.

An effective amount and type of organic, non-ionic surfactant to be used for any specific combination of brine and liquid hydrocarbon can be simply determined by performing a few routine experiments. A suitable procedure comprises incorporating a few non-ionic surfactant candidate materials at a few concentrations in a series of compositions of this invention, agitating the mixture with paddle mixing to thoroughly disperse the brine in the liquid hydrocarbon and allowing the resulting mixture to stand at room temperature for 24 hours. A composition of this invention having an effective amount and type of organic non-ionic surfactant will not separate during the 24 hour observation period.

Although not being required, any of the additives which are generally dissolved or suspended in invert emulsions of the art to modify emulsion properties such as viscosity, filtration, gelling, density and lubricity can be mixed with the emulsion compositions of this invention. Examples of said additives include weighting agents, such as barium sulfate, oyster shells, galena, iron oxide, or powdered limestone; filtration control agents, such as colloidal clays and oxidized asphalts; and viscosity control agents, such as alkaline-neutralized fatty acids, rosin acids and tall oil and polymer fluids, such as xanthan gums, hydroxycellulose and polyacrylamide.

The following examples are disclosed to further teach how to make and use the present invention. All parts and percentages are by weight unless otherwise stated. Herein, Me denotes the methyl radical.

EXAMPLES 1 TO 7

For these examples an isoparaffinic solution (75 percent siloxane/25 percent isoparaffin) of a polydiorganosiloxane having the average formula $$Me_3SiO(MeRSiO)_{58.8}(MeQSiO)_{1.2}SiMe_3$$

wherein R denotes —$C_8H_{17}$ and Q denotes

—$CH_2CH_2CH_2O(CH_2CH_2O)_{20}(CH_2CHCH_3O)_{20}H$, was prepared by reacting 21.6 parts of a siloxane hydride having the formula $Me_3SiO(MeHSiO)_{60}SiMe_3$ with 38.4 parts of octene at 105° C. in the presence of 0.02 parts of an isopropyl alcohol solution of chloroplatinic acid catalyst. The exothermic reaction was controlled by the addition rate of the octane to the siloxane hydride. The resulting product was then diluted with 25 parts of Isopar$^{(R)}$ M (a mixture of isoparaffins having a flash point of at least 100° F. and sold by Exxon Corporation) and 15 parts of $CH_2=CHCH_2O(CH_2CH_2O)_{20}(CH_2CHCH_3O)_{20}H$ and the reaction was continued at 105° C. for 3 hours in the presence of an additional 0.02 parts of the platinum-containing catalyst.

An isoparaffinic solution of a solid, benzene-soluble organopolysiloxane resin (75 percent resin/25 percent isoparaffin) was prepared by mixing 220 parts of a resin (dissolved in xylene), having approximately 0.75 $Me_3SiO_{\frac{1}{2}}$ siloxane units for every $SiO_{4/2}$ siloxane unit and a silicon-bonded hydroxyl content of approximately 3.5 percent, with 75 parts of Isopar$^{(R)}$ M and removing the xylene from the resulting mixture by vacuum distillation at 95° C. The xylene solution of resin copolymer was prepared by mixing 45.2 parts of sodium silicate (41.6° Be) and 17.5 parts of HCl (22° Be) and thereafter admixing therewith 6.3 parts of isopropanol, 20 parts of $Me_3SiCl$, 1.6 parts of $Me_3SiOSiMe_3$ and 9.2 parts of xylene. The organic layer was separated from the aqueous layer and was washed to remove substantially all of the acid.

Two control emulsions and seven emulsion compositions of this invention having 70 percent by volume of brine and 30 percent by volume of diesel oil were prepared by mixing 96 ml. (79 g.) of diesel oil with various amount of the above-described isoparaffinic solutions of polydiorganosiloxane and resin copolymer and then slowly blending therein 224 ml. (515 g.) of a heavy brine containing $CaBr_2$ and $ZnBr_2$ and having a density of 19.2 pounds per gallon at 25° C. A Hamilton-Beach mixer was used for this mixing. The compositions are summarized in Table I. The composition of Example No. 1 was prepared in quadruplicate and the composition of Example No. 2 was prepared in duplicate. Each of the emulsion compositions of Table I were stable at room temperature.

All of the emulsion compositions listed in Table I were tested for high temperature stability by placing a portion thereof in a stainless steel pressure vessel, pressurizing the vessel with nitrogen and heating the pressurized vessel at 400° F. for 16 hours. The results of this high temperature stability test are summarized in Table II.

When the emulsions of Example 1 and 2 were blended with one or two parts of an amine-treated clay (Bentone$^{(R)}$ 38), high temperature stability was lost; however, the resulting compositions were stable at room temperature and are therefore compositions of this invention.

TABLE I

| Example | Polydiorganosiloxane Solution, g.$^{(1)}$ | Polydiorganosiloxane Siloxane, g./100 g.$^{(2)}$ | Resin Copolymer Solution, g.$^{(1)}$ | Resin Copolymer Copolymer, g./100 g.$^{(2)}$ |
|---|---|---|---|---|
| Control i | 14 | 1.77 | None | None |
| Control ii | 28 | 3.54 | None | None |
| No. 1 | 14 | 1.77 | 7 | 0.88 |
| No. 2 | 14 | 1.77 | 14 | 1.77 |
| No. 3 | 28 | 3.54 | 14 | 1.77 |
| No. 4 | 7 | 0.88 | 7 | 0.88 |
| No. 5 | 14 | 1.77 | 2 | 0.25 |
| No. 6 | 15 | 1.89 | 5 | 0.63 |
| No. 7 | 14 | 1.77 | 4 | 0.51 |

$^{(1)}$This number is also equal to the number of pounds of solution to be added to a barrel of emulsion composition.
$^{(2)}$Parts of solvent-free polydiorganosiloxane or solvent-free resin copolymer per 100 parts of brine plus diesel oil.

TABLE II

| Example | Stability at 400° F. |
|---|---|
| Control i | Emulsion broke completely |
| Control ii | Emulsion broke completely |
| No. 1 | Slowly pouring emulsion |
| duplicate | Fluid emulsion |
| triplicate | Layers; blends with shaking |
| quadruplicate | Layers; blends with stirring |
| No. 2 | Thick emulsion, slight breaking |
| duplicate | Thick emulsion |
| No. 3 | Thick emulsion |
| No. 4 | Thick emulsion, trace breaking |
| No. 5 | Two layers, some breaking, blends easily |
| No. 6 | Creaming, disperses with stirring |
| No. 7 | Two layers, trace breaking, blends easily |

EXAMPLES 8 TO 15

For these examples a solvent-free polydiorganosiloxane having the formula $Me_3SiO(MeRSiO)_{64}$—$(MeQSiO)_1SiMe_3$, wherein R denotes —$C_8H_{17}$ and Q denotes —$CH_2CH_2CH_2O(CH_2CH_2O)_{20}(CH_2CHCH_3O)_{20}H$, was prepared by reacting 64 molar portions of octene with 1 molar portion of a siloxane hydride having the formula $Me_3SiO(MeHSiO)_{65}SiMe_3$ as described in Examples 1 to 7, and then dissolving the resulting product in isopropyl alcohol and reacting the resulting solution with 1 molar portion of $CH_2=CHCH_2O(CH_2CH_2O)_{20}(CH_2CHCH_3O)_{20}H$ at 105° C. for 3 hours. The isopropyl alcohol was then removed by vacuum distillation.

The xylene solution of resin copolymer described in Examples 1 to 7 was adjusted to 30 percent xylene and 70 percent resin copolymer and was used to prepare the compositions of these examples.

Two control emulsion compositions and eight emulsion compositions of this invention were prepared by mixing the above described solventless polydiorganosiloxane and the xylene solution of resin copolymer with diesel fuel and the heavy brine described in Examples 1 to 7 was thereafter slowly mixed therewith using a Hamilton-Beach mixer. Table III lists the amounts of each component used. Amine-treated clay (Bentone$^{(R)}$ 38) and/or dimethylformamide (DMF) also listed in Table III, were mixed with the resulting brine-in-diesel oil emulsions, using the sane mixing device.

All of the emulsions listed in Table III were easily pourable compositions which were stable at room temperature. When tested for high temperature stability at 375° F., using the method described in Examples 1 to 7, Compositions 8 and 9 were found to be stable whereas Control iv and Composition 10 were found to be unstable and the emulsion broke. When identically tested, except at 400° F., Compositions 8, 9, 13, 14 and 15 were found to be stable whereas Control iii and Compositions 11 and 12 were found to be unstable and the emulsion broke. Example 8 was run in triplicate and Example 9 was run in duplicate.

The resulting emulsion was an easily pumpable composition and was stable at room temperature and at 350° F. After being tested for high temperature stability at 400° F., as described in Examples 1 to 7 the emulsion composition contained layers of oil and brine; however, an emulsion was easily regenerated by merely stirring the layered composition. When this emulsion was prepared using a high shear Waring Blender, stability at 400° F. was obtained.

EXAMPLE 19

Example 18 was repeated, except using a polydiorganosiloxane containing dodecyl radicals, instead of octyl radicals bonded to silicon atoms. Substantially identical results were obtained.

EXAMPLE 20

Example 19 was repeated, except using a CaBr$_2$ brine

TABLE III

| Example | Heavy Brine | | Diesel Oil | | Polydiorganosiloxane | | Resin Copolymer | | Other | |
|---|---|---|---|---|---|---|---|---|---|---|
| | Grams | V % | Grams | V % | Grams | g./100g.$^{(1)}$ | Soln, g. | Resin g./100g.$^{(1)}$ | Clay, g. | DMF, g. |
| Control iii | 70 | 48 | 27 | 52 | 3 | 3.09 | 0 | 0 | 0 | 0 |
| Control iv | 70 | 53 | 22 | 47 | 3 | 3.26 | 0 | 0 | 2 | 3 |
| No. 8 | 70 | 54 | 21 | 46 | 3 | 3.30 | 4 | 3.08 | 2 | 0 |
| No. 9 | 70 | 56 | 20 | 44 | 3 | 3.33 | 4 | 3.11 | 0 | 3 |
| No. 10 | 70 | 58 | 18 | 42 | 3 | 3.41 | 4 | 3.18 | 2 | 3 |
| No. 11 | 70 | 54 | 21 | 46 | 2 | 2.20 | 4 | 3.08 | 0 | 3 |
| No. 12 | 70 | 57 | 19 | 43 | 2 | 2.25 | 6 | 4.72 | 0 | 3 |
| No. 13 | 70 | 56 | 20 | 44 | 2 | 2.22 | 6 | 4.67 | 2 | 0 |
| No. 14 | 70 | 50 | 25 | 50 | 2 | 2.11 | 2 | 1.47 | 1 | 0 |
| No. 15 | 70 | 48 | 27 | 52 | 1 | 1.03 | 1 | 0.72 | 1 | 0 |

$^{(1)}$Parts of solvent-free polydiorganosiloxane or solvent-free resin copolymer per 100 parts of brine plus diesel oil.

EXAMPLE 16

An emulsion composition of this invention was prepared as in Examples 8 to 15 except using 50 parts of the CaBr$_2$/ZnBr$_2$ brine, having a density of 19.2 pounds per gallon, 20 parts of a CaBr$_2$ brine having a density of 14.2 pounds per gallon, 22 parts of diesel oil, 2 parts of the solventless polydiorganosiloxane, 4 parts of the resin copolymer solution and 2 parts of amine-treated clay (Bentone ® 38). The resulting emulsion was found to be stable at 400° F. for 16 hours.

EXAMPLE 17

An emulsion composition of this invention was prepared as in Examples 8 to 15 except using 70 parts of a CaBr$_2$ brine having a density of 14.2 pounds per gallon, 23 parts of diesel oil, 2 parts of the solventless polydiorganosiloxane, 3 parts of the resin copolymer solution and 2 parts of Bentone ® 38. The resulting emulsion was stable at 400° F. for 16 hours.

EXAMPLE 18

An emulsifier solution composition of this invention was prepared by mixing 75 parts of the isoparaffinic solution of polydiorganosiloxane and 25 parts of the isoparaffinic solution of resin copolymer, each described in Examples 1 to 7.

An emulsion composition of this invention comprising 60 percent by volume of a CaBr$_2$/ZnBr$_2$ brine having a density of 19.2 pounds per gallon and 40 percent by volume of diesel oil was prepared as described in Examples 1 to 7 using the above-described emulsifier composition of this invention. The amount of emulsifier composition that was used was 10 pounds per barrel of finished emulsion.

having a density of 14.2 pounds per gallon. Similar results were obtained.

EXAMPLE 21

Example 19 was repeated, except using a saturated CaCl$_2$ brine. The resulting emulsion was stable, but not as stable as the emulsion of Example 19.

EXAMPLE 22

Several emulsion compositions were prepared by blending the emulsion compositions of Example 19 and 20 in various ratios to prepare emulsions having densities ranging from 10.8 to 14.0 pounds per gallon. These emulsions had good rheological properties that allowed easy pumping of the emulsions.

EXAMPLE 23

The emulsion compositions of Example 18 or 19 was further mixed with barium sulfate as a weighting agent. Some water-wetting of the barium sulfate occurred. This water-wetting was prevented by mixing, with the emulsifier composition, 5 pounds per barrel of Driltreat ®, a phosphatide liquid that is used to stabilize invert emulsion drilling muds and sold by the Baroid Division of National Lead Company.

EXAMPLE 24

Example 6 was repeated except that 160 ml. (instead of 96 ml.) of diesel oil and 160 ml. (instead of 224 ml.) of brine were used to form a 50/50 (V/V%) emulsion. The resulting emulsion contained 2.25 grams of polydiorganosiloxane component and 0.75 grams of resin copolymer component (i.e. 3.00 grams of emulsifier composition) for every 100 grams of brine plus diesel oil. After being heated for 16 hours at 400° F., as described in Example 6 the emulsion of this example was found to contain only a trace amount of broken emulsion.

EXAMPLE 25

For this example a solvent-free polydiorganosiloxane having the formula $Me_3SiO(Me_2SiO)_{100}$—$(MeRSiO)_{45}$-$(MeQSiO)_{2.5}SiMe_3$ wherein R denotes the dodecyl radical and Q denotes the $CH_2CH_2CH_2O(CH_2CH_2O)_{20}$—$(CH_2CHCH_3O)_{20}H$ radical was prepared by sequentially reacting dodecene and then $CH_2=CHCH_2O(CH_2CH_2O)_{20}(CH_2CHCH_3O)_{20}H$ with $Me_3SiO(Me_2SiO)_{100}(MeHSiO)_{47.5}SiMe_3$ as described in Examples 8 to 15, except that the isopropyl alcohol was added with the dodecene instead of with the polyoxyalkylene copolymer.

Five parts of the above-described polydiorganosiloxane and 5 parts of a 50/50 W%/W% solution of the resin copolymer described in Examples 1 to 7 in Isopar ® M were dissolved in 30 parts of diesel oil No. 2. Using an Eppenback mixer 75 parts of the heavy brine described in Examples 1 to 7 were emulsified into the diesel oil/silicone mixture to provide a stable emulsion having a particle size of approximately 0.5 μm. The resulting emulsion having 47 V% heavy brine and 53 V% diesel oil was found to be stable for 30 hours at 212° F.

That which is claimed is:

1. An emulsifier composition consisting essentially of (a) from 30 to 90 percent by weight of a polydiorganosiloxane having the formula

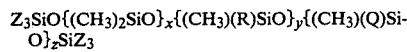
$Z_3SiO\{(CH_3)_2SiO\}_x\{(CH_3)(R)SiO\}_y\{(CH_3)(Q)SiO\}_zSiZ_3$ wherein Q denotes a polyoxyalkylene radical having the formula

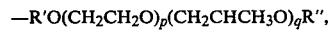
$-R'O(CH_2CH_2O)_p(CH_2CHCH_3O)_qR''$,

R denotes a monovalent hydrocarbon radical having from 6 to 18 carbon atoms, inclusive, R' denotes a divalent organic radical bonded to a silicon atom by a silicon-carbon bond, R'' denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or a Q radical, or an R radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —$(CH_2CH_2O)_p(CH_2CHCH_3O)_q$— portion of the Q radical, there being an average of at least one Q radical and an average of at least one R radical per molecule of the polydiorganosiloxane, and (b) from 10 to 70 percent by weight of a solid, benzene-soluble organopolysiloxane resin copolymer consisting essentially of $(CH_3)_3SiO_{\frac{1}{2}}$ siloxane units and $SiO_{4/2}$ siloxane units, there being from 0.6 to 0.9, inclusive, of said $(CH_3)_3SiO_{\frac{1}{2}}$ siloxane units for every $SiO_{4/2}$ siloxane unit.

2. An emulisifier composition according to claim 1 wherein the polydiorganosiloxane has the formula $(CH_3)_3SiO\{(CH_3)(R)SiO\}_y\{(CH_3)(Q)SiO\}_zSi(CH_3)_3$ wherein z has an average value of from 1 to 5 and the sum of y+z has an average value of from 30 to 70.

3. An emulsifier composition according to claim 2 wherein Q denotes a polyoxyalkylene radical having the formula —$CH_2CH_2CH_2O(CH_2CH_2O)_p(CH_2CHCH_3O)_qH$, the sum of p+q has an average value of about 40, p has an average value of from about 20 to 40, q has an average value of from about 0 to 20 and R denotes an alkyl radical.

4. An emulsifier composition according to claim 1 wherein the polydiorganosiloxane has the formula $(CH_3)_3SiO\{(CH_3)_2SiO\}_x\{(CH_3)(R)SiO\}_y\{(CH_3)(Q)SiO\}_zSi(CH_3)_3$ wherein x has an average value of about 100, y has an average value of from about 30 to 70 and z has an average value of from 1 to 5.

5. An emulsifier composition according to claim 4 wherein Q denotes a polyoxyalkylene radical having the formula —$CH_2CH_2CH_2O(CH_2CH_2O)_p(CH_2CHCH_3O)_qH$, the sum of p+q has an average value of about 40, p has an average value of from about 20 to 40, q has an average value of from about 0 to 20 and R denotes an alkyl radical.

6. An emulsifier composition solution consisting essentially of the emulsifier composition of claims 1, 2, 3, 4, or 5 dissolved in an organic solvent.

7. An emulsifier composition solution according to claim 6 wherein the organic solvent is selected from the group consisting of paraffins having a flash point of at least 100° F., kerosene, diesel oil, crude oil, turbine fuel, mineral oil and gas oil.

8. An emulsion composition comprising (A) 40 to 75 parts by volume of a brine as a discontinuous phase, (B) 25 to 60 parts by volume of a liquid hydrocarbon selected from the group consisting of paraffins having a flash point of at least 100° F., kerosene, diesel oil, crude oil, turbine fuel, mineral oil and gas oil as a continuous phase, (A) and (B) totaling 100 parts by volume and 100 parts by weight, (C) 1.0 to 10 parts by weight, for every 100 parts by weight of brine plus liquid hydrocarbon, of an emulsifier composition consisting essentially of (a) from 30 to 90 percent by weight of a polydiorganosiloxane having the formula

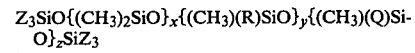
$Z_3SiO\{(CH_3)_2SiO\}_x\{(CH_3)(R)SiO\}_y\{(CH_3)(Q)SiO\}_zSiZ_3$ wherein Q denotes a polyoxyalkylene radical having the formula

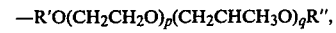
$-R'O(CH_2CH_2O)_p(CH_2CHCH_3O)_qR''$,

R denotes a monovalent hydrocarbon radical having from 6 to 18 carbon atoms, inclusive, R' denotes a divalent organic radical bonded to a silicon atom by a silicon-carbon bond, R'' denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or a Q radical, or an R radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —$(CH_2CH_2O)_p(CH_2CHCH_3O)_q$— portion of the Q radical, there being an average of at least one Q radical and an average of at least one R radical per molecule of the polydiorganosiloxane, and (b) from 10 to 70 percent by weight of a solid, benzene-soluble organopolysiloxane resin copolymer consisting essentially of $(CH_3)_3SiO_{\frac{1}{2}}$ siloxane units and $SiO_{4/2}$ siloxane units, there being from 0.6 to 0.9, inclusive, of said $(CH_3)_3SiO_{\frac{1}{2}}$ siloxane units for every $SiO_{4/2}$ siloxane unit.

9. An emulsion composition according to claim 8 wherein the polydiorganosiloxane has the formula $(CH_3)_3SiO\{(CH_3)(R)SiO\}_y\{(CH_3)(Q)SiO\}_zSi(CH_3)_3$ wherein z has an average value of from 1 to 5 and the sum of y+z has an average value of from 30 to 70.

10. An emulsion composition according to claim 9 wherein Q denotes a polyoxyalkylene radical having the formula —$CH_2CH_2CH_2O(CH_2CH_2O)_p(CH_2CHCH_3O)_qH$, the sum of p+q has an average value of about 40, p has an average value of from about 20 to 40, q has an average value of from about 0 to 20 and R denotes an alkyl radical.

11. An emulsion composition according to claim 8 wherein the polydiorganosiloxane has the formula $(CH_3)_3SiO\{(CH_3)_2SiO\}_x\{(CH_3)(R)SiO\}_y\{(CH_3)(Q)SiO\}_zSi(CH_3)_3$ wherein x has an average value of about 100, y has an average value of from about 30 to 70 and z has an average value of from 1 to 5.

12. An emulsion composition according to claim 11 wherein Q denotes a polyoxyalkylene radical having the formula —$CH_2CH_2CH_2O(CH_2CH_2O)_p(CH_2CHCH_3O)_qH$, the sum of p+q has an average value of about 40, p has an average value of from about 20 to 40, q has an average value of from about 0 to 20 and R denotes an alkyl radical.

13. An emulsion composition according to claims 8, 9, 10, 11, or 12 wherein the brine is an aqueous solution of calcium bromide and zinc bromide and has a density of about 20 pounds per gallon at 20° C.

14. An emulsion composition according to claim 13 wherein the brine is present in an amount of from 50 to 70 parts by volume and the liquid hydrocarbon is present in an amount of from 30 to 50 parts by volume.

15. An emulsion composition according to claim 14, wherein the liquid hydrocarbon is at least 90 percent by volume diesel fuel, based on the total volume of liquid hydrocarbon.

16. An emulsion composition according to claims 8, 9, 10, 11, or 12 wherein the brine is present in an amount of from 50 to 70 parts by volume and the liquid hydrocarbon is present in an amount of from 30 to 50 parts by volume.

17. A method comprising (I) mixing to form a solution, (i) 1.0 to 10 parts by weight of an emulsifier composition consisting essentially of (a) from 30 to 90 percent by weight of a polydiorganosiloxane having the formula $Z_3SiO\{(CH_3)_2SiO\}_x\{(CH_3)(R)SiO\}_y\{(CH_3)(Q)SiO\}_zSiZ_3$ wherein Q denotes a polyoxyalkylene radical having the formula —$R'O(CH_2CH_2O)_p(CH_2CHCH_3O)_qR''$, R denotes a monovalent hydrocarbon radical having from 6 to 18 carbon atoms, inclusive, R' denotes a divalent organic radical bonded to a silicon atom by a silicon-carbon bond, R" denotes a monovalent radical selected from the group consisting of hydrogen, alkyl, cycloaliphatic, aryl, arylalkyl and acyl radicals, Z denotes a monovalent hydrocarbon radical having from 1 to 5 carbon atoms, inclusive, or a Q radical, or an R radical, x has an average value of from 0 to 400, y has an average value of from 0 to 400, z has an average value of from 0 to 5, x+y+z has an average value of from 30 to 400, p has an average value equal to or greater than the average value of q and p+q has an average value sufficient to provide a formula weight of from 600 to 3500 for the —$(CH_2CH_2O)_p(CH_2CHCH_3O)_q$— portion of the Q radical, there being an average of at least one Q radical and an average of at least one R radical per molecule of the polydiorganosiloxane, and (b) from 10 to 70 percent by weight of a solid, benzene-soluble organopolysiloxane resin copolymer consisting essentially of $(CH_3)_3SiO_{\frac{1}{2}}$ siloxane units and $SiO_{4/2}$ siloxane units, there being from 0.6 to 0.9, inclusive, of said $(CH_3)_3SiO_{\frac{1}{2}}$ siloxane units for every $SiO_{4/2}$ siloxane unit, and (ii) aV parts by volume of a liquid hydrocarbon selected from the group consisting of paraffins having a flash point of at least 100° F., kerosene, diesel oil, crude oil, turbine fuel, mineral oil, and gas oil, (II) mixing the solution of step (I) with bV parts by volume of a liquid hydrocarbon selected from the group stated in (ii), (III) mixing V' parts by volume of a brine with the solution of step (II) with sufficient shear energy to provide an emulsion having a brine particle size of less than 10 micrometers in diameter, and (IV) mixing the emulsion of step (III) with cV parts by volume of a liquid hydrocarbons selected from the group stated in (ii), wherein V has a value of from 25 to 60 parts by volume, V' has a value of from 40 to 75 parts by volume, V+V' total 100 parts by weight and 100 parts by volume, a has a value of from greater than zero to 1, b has a value of from zero to less than 1, c has a value of from zero to less than 1, and a+b+c has a value of 1.

18. A method according to claim 17 wherein V has a value of from 50 to 70 parts by volume and V' has a value of from 30 to 50 parts by volume.

19. A method according to claims 17 or 18 wherein a has a value of less than 1.

20. A method according to claim 19 wherein b has a value of (1−a) and c has a value of zero.

21. A method according to claim 19 wherein a has a value of from 0.0001 to 0.1.

22. A method according to claim 19 wherein the liquid hydrocarbon of (ii) is a paraffin having a flash point of at least 100° F.

23. A method according to claim 22 wherein the balance of the liquid hydrocarbon is diesel fuel.

* * * * *